No. 843,783. PATENTED FEB. 12, 1907.
S. T. WILSON.
FLOUR PURIFIER, ASPIRATOR, AND BLEACHER.
APPLICATION FILED FEB. 1, 1906.
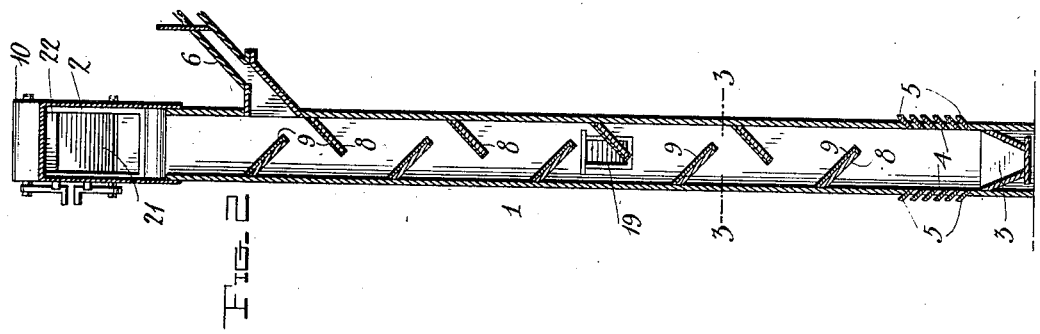
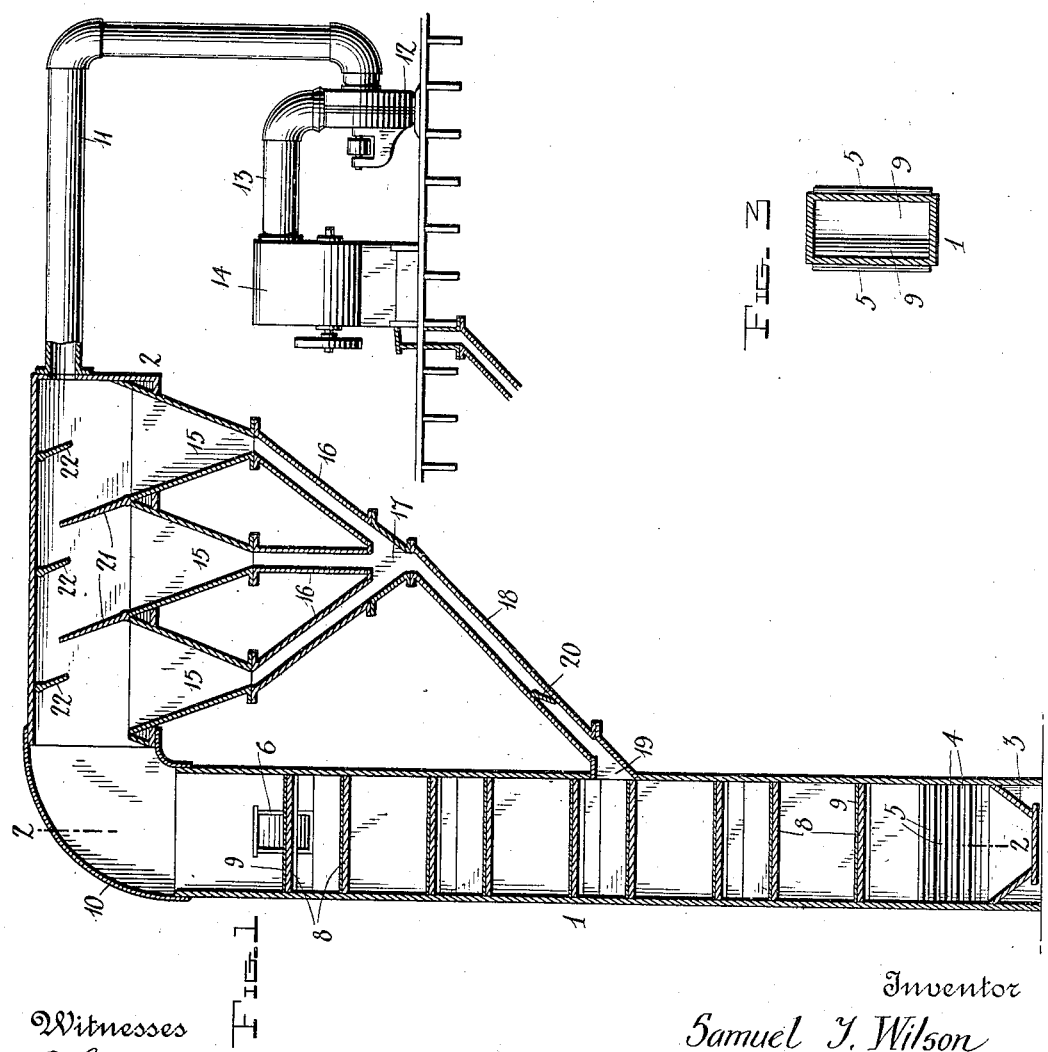
Witnesses
Inventor
Samuel T. Wilson
by
Attorney

UNITED STATES PATENT OFFICE.

SAMUEL T. WILSON, OF CHARLESTON, WEST VIRGINIA.

FLOUR PURIFIER, ASPIRATOR, AND BLEACHER.

No. 843,783.  Specification of Letters Patent.  Patented Feb. 12, 1907.

Application filed February 1, 1906. Serial No. 299,011.

*To all whom it may concern:*

Be it known that I, SAMUEL T. WILSON, a citizen of the United States, residing at Charleston, in the county of Kanawha and State of West Virginia, have invented certain new and useful Improvements in Flour Purifiers, Aspirators, and Bleachers; and I do declare the following to be a full, clear, and exact description of the invention, such as will enable others skilled in the art to which it appertains to make and use the same.

My invention relates to improvements in apparatus for treating flour, and consists in the novel construction, combination, and arrangement of devices hereinafter described and claimed.

The object of the invention is to provide a machine or apparatus which will effectively remove all coloring-matter and objectionable odors from the flour and at the same time thoroughly dry and bleach it.

The above and other objects, which will appear as the nature of the invention is better understood, are accomplished by means of the construction illustrated in the accompanying drawings, in which—

Figure 1 is a vertical sectional view through a flour purifier, aspirator, and bleacher constructed in accordance with my invention. Fig. 2 is a vertical sectional view taken on the plane indicated by the line 2 2 in Fig. 1, and Fig. 3 is a detail horizontal sectional view taken on the line 3 3 in Fig. 2.

Referring to the drawings by numeral, 1 denotes the leg of the machine or apparatus, which is in the form of a chute arranged vertically in a suitable building or other support and is in communication at its upper end with a horizontally-disposed separator-casing 2. The leg or chute 1 is preferably of rectangular form in cross-section, as seen in Fig. 3, and in practice should be at least twenty-four feet in height. At its bottom is arranged a suitable discharge valve or gate 3, from which the flour is removed after it has been treated, and in its side walls, adjacent to its bottom, are formed air-inlet openings 4, which are partially closed by downwardly or inwardly inclined overlapping slats 5, which permit of the entrance of air and prevent the discharge of flour between them.

The flour is introduced into the upper portion of the leg or chute 1 through an inlet-chute 6, which has a suitable closure, as shown in Fig. 2, and as it falls through the leg or chute it is caused to take a zigzag course and to spread out into a thin sheet by downwardly and inwardly inclined distributing or deflector boards 8, which are preferably covered with a polished surface of metal or the like 9. These deflectors 8 are arranged upon the opposing side walls of the leg or chute 1, as clearly shown in Fig. 2 of the drawings. The leg or chute 1 has its upper end connected by an elbow 10 to one end of the separator, and from the opposite end of the latter leads a suction-pipe 11. Said pipe has its opposite end in communication with an exhaust blower or fan 12, which may be of any desired form and construction and from the casing of which leads a discharge-pipe 13, which discharges the dust from the flour into a suitable dust-collector 14, which latter may also be of any desired form and construction.

The separator-casing 2 has arranged in its bottom a series of substantially V-shaped settling pockets or chambers 15, from the contracted lower ends of which lead pipes 16, which converge toward each other and unite in a Y-coupling at 17. From the latter extends an inclined pipe or conductor 18, which is adapted to return the good stock which falls into the pockets 15 into the leg or chute 1, as shown at 19. In the pipe 18 is provided a swinging gravity-seated valve 20, which permits the flour to pass downwardly beneath it, but prevents the passage of air upwardly through the pipe 18 from the leg 1 to the pockets 15. The currents of air through the separator-casing 2 are controlled and regulated by two series of valves 21 22, the former being mounted between the chambers 15 at their upper ends and the latter being mounted upon the top of the casing 2 between the valves 21 and at the ends thereof, as clearly shown in Fig. 1. These valves 21 22 are mounted to swing upon shafts which project through the casing and have adjusting means upon their outer ends, as shown in Fig. 2, so that they may be retained in any angular position to vary the space between their free ends or edges.

If desired, two or more grades of stock may be treated in the same machine by arranging the legs or chutes 1 in parallel relation and employing the same exhauster 12 and dust-collector 13, as will be readily understood.

The construction, operation, and advantages of the invention will be readily understood from the foregoing description, taken in connection with the accompanying drawings.

It will be seen that this machine or apparatus will effectively remove all coloring-matter—such as grease, dirt, fiber, and the like—left on the wheat-grain from improper scouring, also the trouble from coal-smoke in mills in manufacturing towns and cities. It will also remove all odors—such as garlic, smut, and must—and it will age the flour by drying it in the air-currents, thereby making it perfectly safe to export to warm climates. It also effectively bleaches the flour, because it subjects every particle of the same to the air-currents.

Various changes in the form, proportion, and the minor details of construction may be resorted to without departing from the principle or sacrificing any of the advantages of the invention as defined by the appended claim.

Having thus described my invention, what I claim as new, and desire to secure by Letters Patent, is—

The herein-described flour purifier aspirator and bleacher, comprising a vertical chute having reversely-disposed deflectors in opposite sides and outwardly and inwardly inclined air-intakes near its lower end, a valved feed-spout communicating with said chute near the upper end thereof and feeding flour thereto, a separator connected to and communicating with the upper end of said chute, said separator having pockets in its under side, baffle-valves extending upwardly from the division-walls of said pockets, and downwardly-extending baffle-valves in its upper side intermediate the first-named baffle-valves, an inclined pipe discharging into said chute at a point between the upper and lower ends thereof, said pipe communicating at its upper ends with the pockets and having a gravity-acting valve near its lower end, and a fan-blower to create an exhaust-current of air upwardly through the chute and through the separator, over the pockets of the latter.

In testimony whereof I have hereunto set my hand in presence of two subscribing witnesses.

SAMUEL T. WILSON.

Witnesses:
D. F. HOSTETLER,
A. N. WILSON.